United States Patent [19]
Nakai et al.

[11] Patent Number: 5,287,154
[45] Date of Patent: Feb. 15, 1994

[54] THERMAL TONER IMAGE FIXING DEVICE WHICH USES FUZZY LOGIC

[75] Inventors: Hitoshi Nakai; Makoto Suzuki, both of Nagoya, Japan

[73] Assignee: Brother Kogyo Kabushiki Kaisha, Nagoya, Japan

[21] Appl. No.: 757,647

[22] Filed: Sep. 11, 1991

[30] Foreign Application Priority Data

Sep. 12, 1990 [JP] Japan ............................ 2-241862

[51] Int. Cl.$^5$ ............................................. G03G 15/20
[52] U.S. Cl. ..................................... 355/285; 355/208; 364/274.6
[58] Field of Search ............... 355/203, 208, 282, 285, 355/289, 204; 364/274.6, 275.1, 275.2

[56] References Cited

U.S. PATENT DOCUMENTS

| | | | |
|---|---|---|---|
| 4,920,250 | 4/1990 | Urban | 355/285 X |
| 5,029,314 | 7/1991 | Katsumi et al. | 355/208 |
| 5,142,332 | 8/1992 | Osawa et al. | 355/208 |
| 5,166,873 | 11/1992 | Takatsu et al. | 364/151 |
| 5,175,801 | 12/1992 | Iokibe | 395/61 |

*Primary Examiner*—Leo P. Picard
*Assistant Examiner*—Christopher Horgan
*Attorney, Agent, or Firm*—Oliff & Berridge

[57] ABSTRACT

A thermal toner image fixing device thermally fuses and fixes a toner image to a sheet of paper. The thermal toner image fixing device has a sensor for detecting the surface reflectance of the sheet, a sensor for detecting the electric resistance of the sheet, and a sensor for detecting the ambient temperature. A temperature threshold level for a thermal fixing roller of the thermal toner image fixing device is determined according to fuzzy logic operations based on the detected surface temperature, the detected resistance, and the detected ambient temperature, and also control rules stored in a memory.

8 Claims, 8 Drawing Sheets

| AMBIENT TEMPERATURE | (Z) | L | | | H | | |
|---|---|---|---|---|---|---|---|
| SURFACE REFLECTANCE | (X) | L | M | H | L | M | H |
| RESISTANCE (Y) | L | H (R1) | | SH (R4) | M (R6) | | SL (R9) |
| | M | | SH (R3) | | | SL (R8) | |
| | H | SH (R2) | | M (R5) | SL (R7) | | L (R10) |

SHEET SURFACE REFLECTANCE

SHEET VOLUME RESISTANCE

AMBIENT TEMPERATURE

TEMPERATURE THRESHOLD LEVEL

GREATER SURFACE ROUGHNESS

SMALLER SURFACE ROUGHNESS

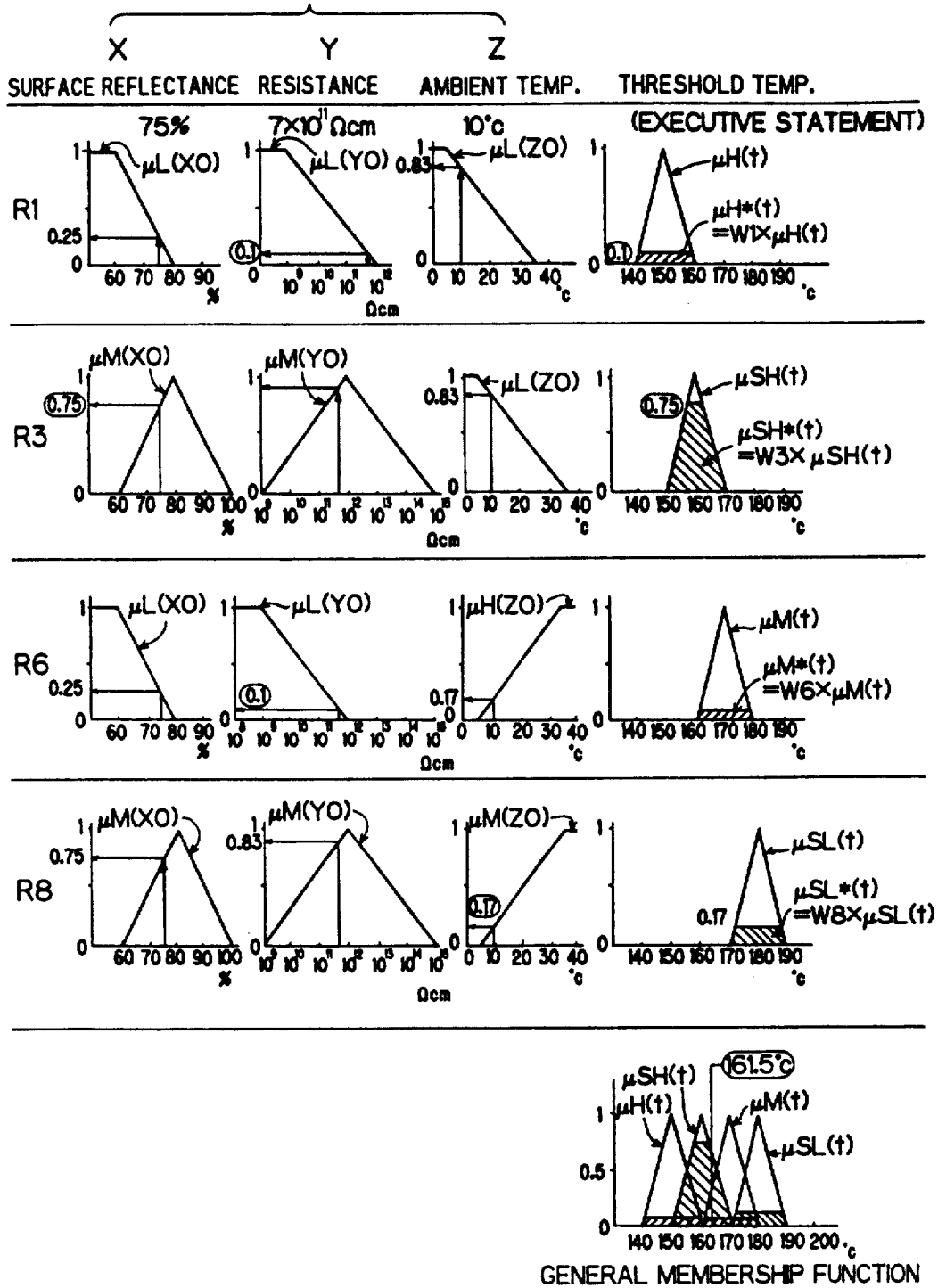

000# THERMAL TONER IMAGE FIXING DEVICE WHICH USES FUZZY LOGIC

BACKGROUND OF THE INVENTION

1. Field of the Invention

The present invention relates to a device for thermally fixing toner images in copying machines, printers, facsimile machines, or the like.

2. Description of the Prior Art

One conventional device for thermally fixing toner images is shown in FIG. 1 of the accompanying drawings. The conventional thermal toner image fixing device includes a heater 9, a temperature fuse 10, a heater control circuit 6, and an AC power supply 7. The heater 9 is surrounded by a thermal fixing roller 8 for fixing toner to a sheet of paper. The temperature of the thermal fixing roller 8 is detected by a surface temperature sensor 1 that is positioned near the thermal fixing roller 8. A controller 11, which is in the form of a microprocessor, determines whether the temperature as detected by the surface temperature sensor 1 is higher than a predetermined temperature or not, and sends a control signal to the heater control circuit 6.

If the temperature as detected by the surface temperature sensor 1 is lower than the predetermined temperature, then the controller 11 applies a control signal to the heater control circuit 6, which then energizes the heater 9 thereby heating the thermal fixing roller 8.

Generally, in order to fix toner sufficiently to a sheet of paper in the thermal toner image fixing device, it is necessary that the viscosity of a toner layer contacting the sheet as well as a surface toner layer remote from the sheet be lower than a certain viscosity level (normally in the range of from 104 to 105 poise), and the toner be impregnated in paper fibers of the sheet under the pressure of a pressure roller that is pressed at the same time when the toner is heated.

Heretofore, the energization of the heater is controlled based only on the comparison between the predetermined temperature and the temperature as detected by the surface temperature sensor 1. The predetermined temperature remains the same irrespective of various conditions that affect the fixing of the toner. Specifically, the toner is fixed at the same temperature even if the sheet has a different paper quality, the water content of the sheet varies due to a relative humidity around the copying machine, the printer, or the facsimile machine, and the temperature of the sheet varies depending on the ambient temperature of the copying machine, the printer, or the facsimile machine. When these conditions vary, however, the toner is fixed to different degrees.

For example, when the thermal fixing roller is heated to the same temperature, the toner fixation is poorer as the surface roughness of the sheet is greater. This is because the toner that has been softened below a certain viscosity level is not well impregnated in the paper fibers of the sheet since the wettability of the paper fibers with respect to the softened toner is lower as the surface roughness of the sheet is greater. If the surface roughness of the sheet is greater, then the paper fibers tends to be peeled off more easily when the fixed toner is subjected to shearing or peeling forces. When the shearing or peeling forces are applied, the fixed toner as well as the paper fibers held in contact therewith is peeled off.

The toner fixation is also poorer as the sheet has a higher water content. If the water content of the sheet is higher, then a larger proportion of the thermal energy that is applied to heat the toner and the sheet is consumed to evaporate the water in the sheet. Consequently, the toner and the sheet are not sufficiently heated. The temperature at the boundary between the toner and the sheet does not rise to a level necessary to fix the toner to the sheet, and the viscosity of the toner at the boundary does not decrease to a level necessary to fix the toner to the sheet.

If the ambient temperature is lower, then the temperature of the sheet is also lower, and the temperature at the boundary between the toner and the sheet does not rise to a level necessary to fix the toner to the sheet, resulting in poor toner fixation.

SUMMARY OF THE INVENTION

In view of the aforesaid drawbacks of the conventional thermal toner image fixing device, it is an object of the present invention to provide a thermal toner image fixing device which can thermally fix toner images to a sheet of paper to a constant degree irrespective of various conditions including quality of the sheet, electric resistance of the sheet, and ambient environment which would otherwise affect the fixation of the toner.

To achieve the above and other objects, there is provided, according to the present invention, a device for thermally fusing and fixing a toner image on a sheet, which comprises an energy source for supplying energy; heating means connected to the energy source for generating heat to be applied to an image-formed sheet; detecting means for detecting quality of the sheet, electric resistance of the sheet, and ambient environment of the sheet; storage means for storing control rules used for determining a fixing parameter corresponding to the quality of the sheet, the electric resistance of the sheet, and the ambient environment of the sheet; and processing means for determining the fixing parameter according to fuzzy logic operations based on the quality of the sheet, the electric resistance of the sheet, and the ambient environment of the sheet as detected by the detecting means and the control rules read from the storage means, heat generated from the heating means being controlled in response to the fixing parameter determined by the processing means.

Based on the quality of the sheet electric resistance of the sheet, and the ambient environment as detected by the detecting means and also based on the control rules read from the storage means, the fixing parameter is determined according to fuzzy logic operations by the processing means. A temperature for the heating means which is typically in the form of roller may be used as the fixing parameter.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 9 shows various diagrams for illustrating a second example of the present invention.

DETAILED DESCRIPTION OF THE PREFERRED EMBODIMENT

Figure 2:
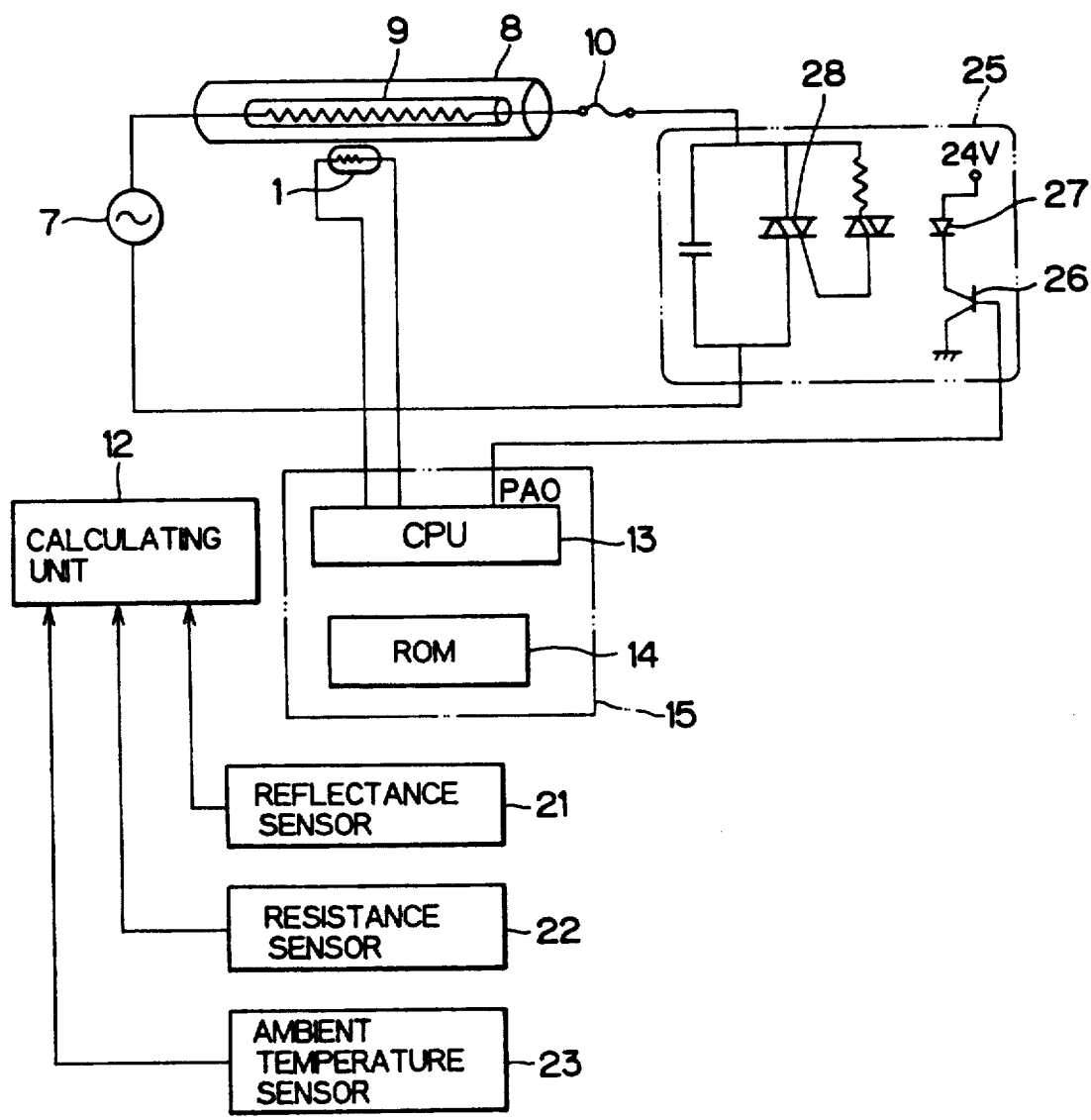
FIG. 2 is a block diagram showing a thermal toner image fixing device according to the present invention.

As shown in FIG. 2, a thermal toner image fixing device according to the present invention includes a heater 9, a temperature fuse 10, an AC power supply 7, and a thermal fixing roller 8 for fixing toner to a sheet of paper, the thermal fixing roller 8 surrounding the heater 9. The temperature of the thermal fixing roller 8 is detected by a surface temperature sensor 1.

The thermal toner image fixing device also has three sensors for detecting quality of a sheet of paper to which toner is to be fixed electric resistance of the sheet, and ambient environment which affect the fixation of the toner. More specifically, the thermal toner image fixing device has a sheet reflectance sensor 21 for detecting the reflectance of the surface of the sheet as a quality of the sheet, rather than the surface roughness of the sheet, a sheet resistance sensor 22 for detecting the electric resistance of the sheet, rather than the water content of the sheet, and an ambient temperature sensor 23 for detecting an ambient temperature around the sheet or the thermal toner image fixing device.

The thermal toner image fixing device also has a calculating unit 12 for calculating numerical values representing the surface reflectance, the resistance, and the ambient temperature as detected by the respective sensors 21, 22, 23, and a fuzzy reasoning processor 15 for determining a temperature setting according to a fuzzy reasoning process based on the numerical values calculated by the calculating unit 12. The fuzzy reasoning processor 15 includes a ROM 14 for storing control rules to determine an optimum temperature setting for the thermal toner image fixing device, and a CPU 13 for executing the fuzzy reasoning process based on the control rules read from the ROM 14.

The surface temperature sensor 1 is of a known nature and includes a thermistor that is embedded in the surface of an elastic member of silicone sponge or the like and covered with a heat-resistant, slippery thin film of fluoroplastic, polyimide, or the like. The surface temperature sensor 1 is held against the surface of the thermal fixing roller 8.

The fuzzy reasoning processor 15 determines an optimum temperature threshold value TS for the thermal fixing roller 8, using the numerical data representing the surface reflectance, resistance, and ambient temperature from the calculating unit 12, compares the surface temperature TR of the thermal fixing roller 8 as detected by the surface temperature sensor 1 with the estimated optimum temperature threshold level TS, and applies a control signal to a heater control circuit 25 to selectively energize the heater 9 so that the surface temperature TR equals the optimum temperature threshold level TS.

The heater control circuit 25 includes a transistor 26 to which a control signal from the CPU 13 is applied, a phototriac 27 for converting an output signal from the transistor 26 into a light signal, and a triac 28 for turning on and off an alternating current from the AC power supply 7 in response to the light signal from the phototriac 27.

One quality of the sheet of paper which affects the toner fixation is the surface roughness of the sheet as described above. However, the reflectance of the sheet may be used as a substitute for the surface roughness of the sheet.

Figure 6A:
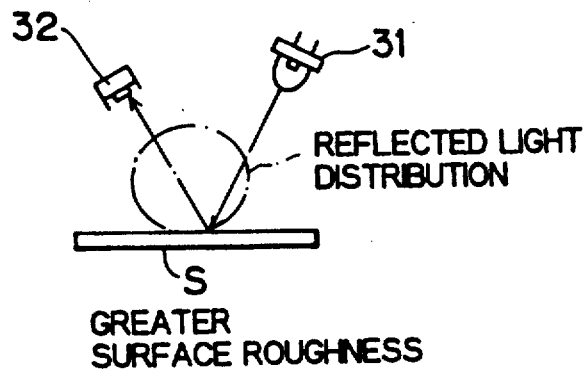
FIGS. 6(a) and 6(b) are schematic elevational views showing the principles of a sheet reflectivity sensor in the thermal toner image fixing device shown in FIG. 3.
Figure 6B:
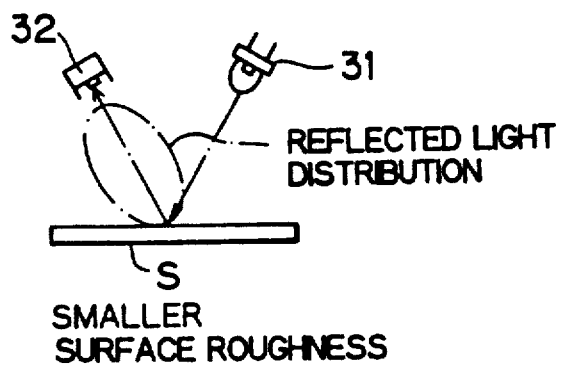

FIGS. 6(a) and 6(b) illustrate the principles of the sheet reflectance sensor 21. The sheet reflectance sensor 21 includes an infrared LED 31 with a condensing lens as a light source for applying light to the surface of the sheet, and a photodiode 32 for detecting light reflected from the surface of the sheet. If the surface of the sheet is more fibrous and has a higher level of roughness, as shown in FIG. 6(a), then the intensity of light reflected from the sheet surface to the photodiode 32 is lower. Conversely, if the surface of the sheet is less fibrous and has a lower level of roughness or is smoother, as shown in FIG. 6(b), then the intensity of light reflected from the sheet surface to the photodiode 32 is higher. The intensity of light applied to the photodiode 32 is detected by a voltage which is converted from a current generated by the photodiode 32. A circuit for detecting the intensity of light applied to the photodiode is well known in the art, and will not be described herein.

Figure 7:
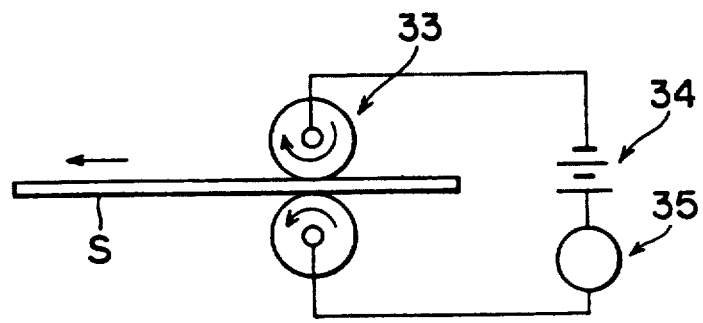
FIG. 7 is a schematic elevational view showing the principles of a sheet resistance sensor in the thermal toner image fixing device shown in FIG. 3.

FIG. 7 illustrates the principles of the resistance sensor 22. The resistance sensor 22 includes a pair of electrically conductive rollers 33 positioned on a feed path for a sheet S of paper, for gripping the sheet S therebetween and feeding the sheet S along the feed path, a power supply 34 for applying a DC voltage between the rollers 33, and a current detector 35 for detecting a current flowing through the sheet S between the rollers 33. If the water content of the sheet S is lower, then the volume resistance of the sheet S is higher and the current as detected by the current detector 35 is smaller. Conversely, if the water content of the sheet S is higher, then the volume resistance of the sheet S is lower and the current as detected by the current detector 35 is larger. The detected current is converted into a voltage, which is applied to the calculating unit 12. The resistance thus measured of the sheet S is used as a substitute for the water content of the sheet S.

The fuzzy reasoning process for determining the temperature threshold level TS for the thermal fixing roller 8 is carried out according to the following ten control rules:

R1: If the surface reflectance of the sheet is lower than a medium level, the resistance of the sheet is lower than a medium level, and the ambient temperature is relatively low, then the temperature threshold level TS is set to a high level.

R2: If the surface reflectance of the sheet is lower than the medium level, the resistance of the sheet is higher than the medium level, and the ambient temperature is relatively low, then the temperature threshold level TS is set to a slightly high level.

R3: If the surface reflectance of the sheet is at the medium level, the resistance of the sheet is at the medium level, and the ambient temperature is relatively low, then the temperature threshold level TS is set to the slightly high level.

R4: If the surface reflectance of the sheet is higher than the medium level, the resistance of the sheet is lower than the medium level, and the ambient temperature is relatively low, then the temperature threshold level TS is set to the slightly high level.

R5: If the surface reflectance of the sheet is higher than the medium level, the resistance of the sheet is higher than the medium level, and the ambient temperature is relatively low, then the temperature threshold level TS is set to a medium level.

R6: If the surface reflectance of the sheet is lower than the medium level, the resistance of the sheet is lower than the medium level, and the ambient temperature is relatively high, then the temperature threshold level TS is set to the medium level.

R7: If the surface reflectance of the sheet is lower than the medium level, the resistance of the sheet is higher than the medium level, and the ambient temperature is relatively high, then the temperature threshold level TS is set to a slightly low level.

R8: If the surface reflectance of the sheet is at a medium level, the resistance of the sheet is at the medium level, and the ambient temperature is relatively high, then the temperature threshold level TS is set to the slightly low level.

R9: If the surface reflectance of the sheet is higher than the medium level, the resistance of the sheet is lower than the medium level, and the ambient temperature is relatively high, then the temperature threshold level TS is set to the slightly low level.

R10: If the surface reflectance of the sheet is higher than the medium level, the resistance of the sheet is higher than the medium level, and the ambient temperature is relatively high, then the temperature threshold level TS is set to a low level.

Figures 1, 3:
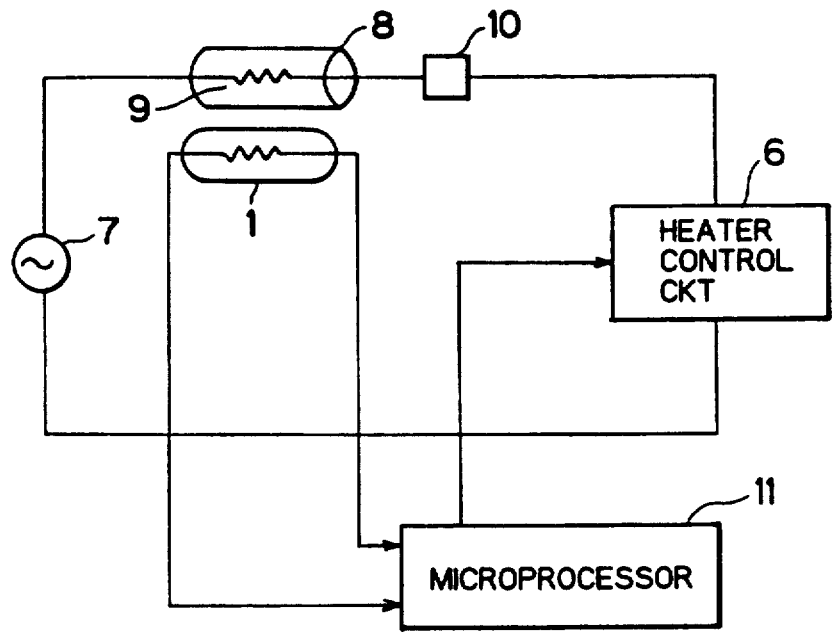
FIG. 1 is a block diagram showing a conventional thermal toner image fixing device.
FIG. 3 is a table showing control rules employed in the thermal toner image fixing device shown in FIG. 3.

These temperature threshold levels TS as determined depending on the surface reflectance, the resistance, and the ambient temperature are shown in the table of FIG. 3. In FIG. 3, the surface reflectance is of three levels (L: low level, M: medium level, and H: high level) given in a horizontal row, and the ambient temperature is of two levels (L: relatively low, and H: relatively high) given in another horizontal row. The resistance is of three levels (L: low level, M: medium level, and H: high level) given in a vertical column. The temperature threshold level TS is set to one of five levels (H: high level, SH: slightly high level, M: medium, SL: slightly low level, and L: low level) depending on the combination of the above various levels of the surface reflectance, resistance, and ambient temperature.

The control rules R1, R2, R3, R4, R5, R6, R7, R8, R9 and R10 that are defined as above are indicated respectively by (R1), (R2), (R3), (R4), (R5), (R6), (R7), (R8), (R9) and (R10) in FIG. 3.

An operational sequence of the fuzzy reasoning processor 15 for determining the temperature threshold level TS will be described below.

When output signals from the sheet reflectance sensor 21, the resistance sensor 22, and the ambient temperature sensor 23 are applied to the calculating unit 12, the calculating unit 12 calculates the surface reflectance, the resistance, and the ambient temperature. The calculated values are supplied from the calculating unit 12 to the CPU 13 of the fuzzy reasoning processor 15. The CPU 13 reads the control rules from the ROM 14, and determines a temperature threshold level TS based on the calculated values supplied from the calculating unit 12 according to the fuzzy reasoning process (to be described later on).

The CPU 13 then compares the surface temperature TR as detected by the surface temperature sensor 1 with the determined temperature threshold level TS for the thermal fixing roller 8, and applies a control signal to the heater control circuit 25 so that the surface temperature TR equals the threshold temperature level TS.

In the heater control circuit 25, the triac 28 turns on and off the alternating current flowing through the heater 9 based on the control signal from the CPU 13, thereby controlling the energization of the heater 9.

Since the control rules R1 through R10 are defined as described above and shown in FIG. 3, if the surface reflectance, the resistance, and the ambient temperature take values between the low, medium, and high levels, then it is necessary to determine proportions at which the conditional statements (i.e., IF statements) in the control rules are satisfied, and then to determine the temperature threshold level TS according to the determined proportions. To meet the above requirements, membership functions with respect to the surface reflectance, the resistance, the ambient temperature, and the temperature threshold level TS are used for calculations.

Figure 4A:
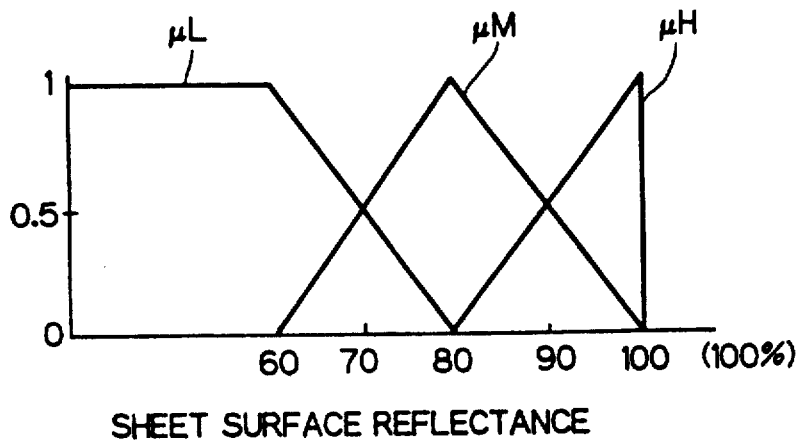
FIG. 4(a) is a diagram showing membership functions of fuzzy variables with respect to the reflectance of a sheet of paper.

FIG. 4(a) shows membership functions $\mu H(x)$, $\mu M(x)$, $\mu L(x)$ of fuzzy variables H, M, L with respect to the surface reflectance of the sheet.

Figure 4B:
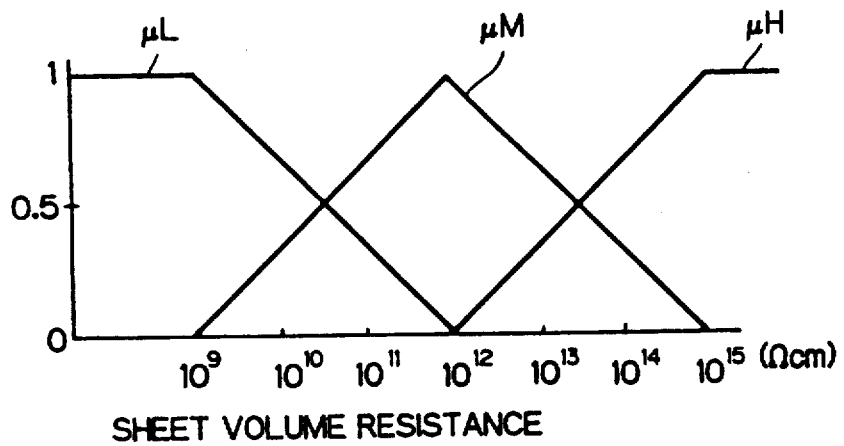
FIG. 4(b) is a diagram showing membership functions of fuzzy variables with respect to the resistance of a sheet of paper.

FIG. 4(b) shows membership functions $\mu H(y)$, $\mu M(y)$, $\mu L(y)$ of fuzzy variables H, L with respect to the volume resistance of the sheet.

Figure 4C:
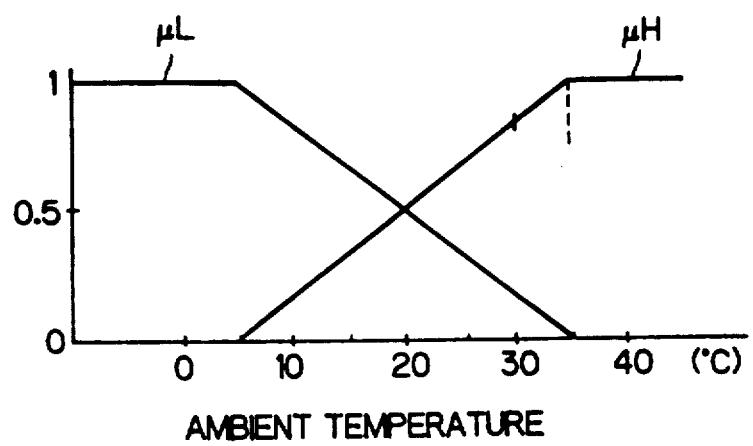
FIG. 4(c) is a diagram showing membership functions of fuzzy variables with respect to the ambient temperature.

FIG. 4(c) shows membership functions $\mu H(z)$, $\mu M(z)$, $\mu L(z)$ of fuzzy variables H, M, L with respect to the ambient temperature.

Figure 4D:
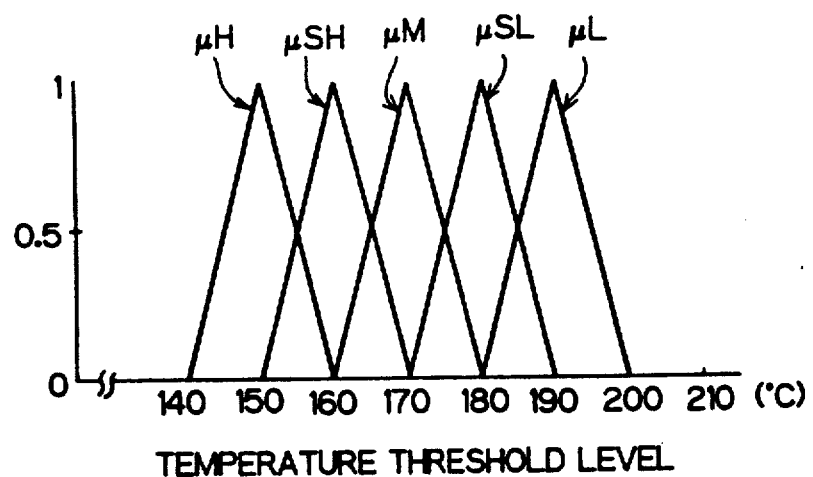
FIG. 4(d) is a diagram showing membership functions of fuzzy variables with respect to a preset temperature threshold value.

FIG. 4(d) shows membership functions $\mu H(t)$, $\mu SH(t)$, $\mu M(t)$ $\mu SL(t)$; $\mu L(t)$ of fuzzy variables H, SH, M, SL, L with respect to the temperature threshold level.

According to the fuzzy reasoning process carried out by the fuzzy reasoning processor 15, a temperature threshold level is determined using the control rules R1 through R10 and the membership functions shown in FIGS. 4(a) through 4(d).

Figure 5:
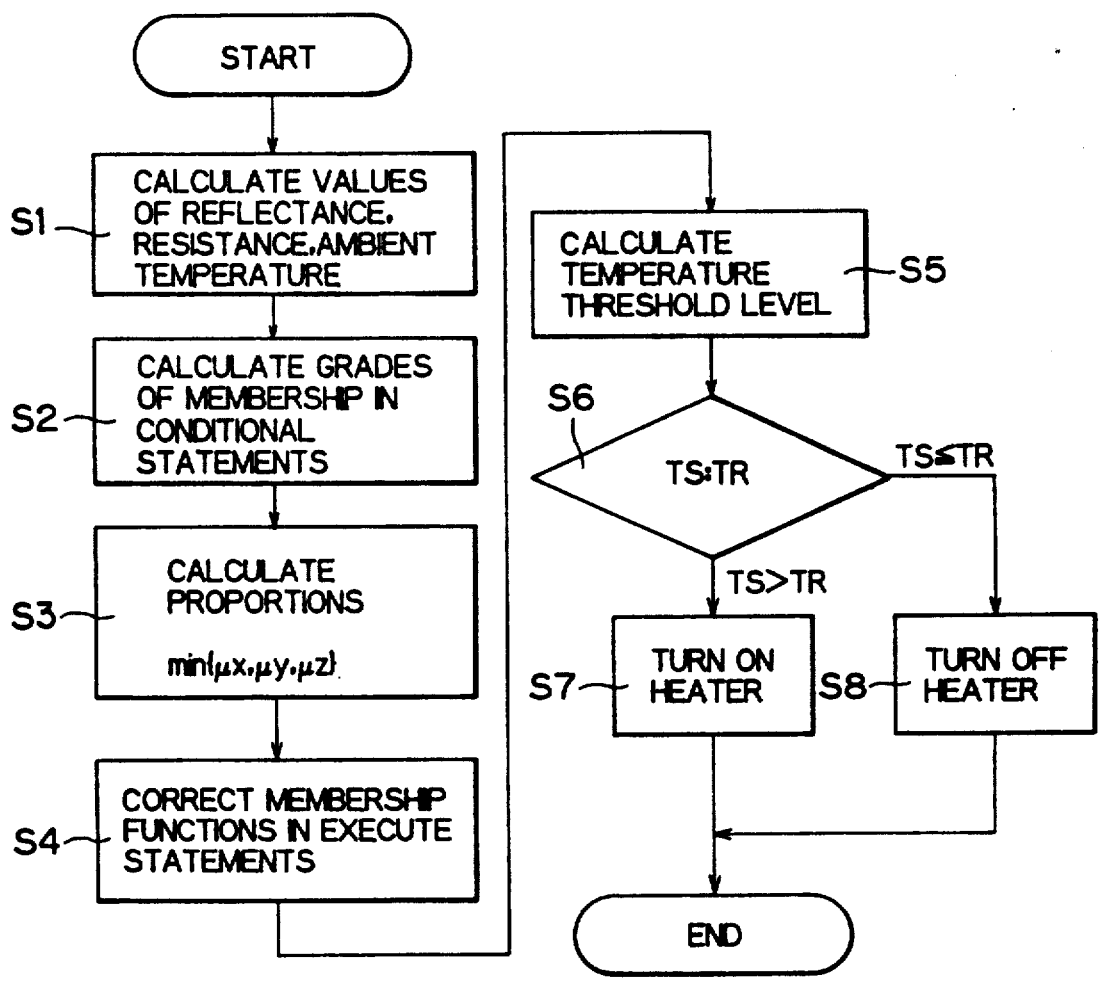
FIG. 5 is a flowchart of a fuzzy reasoning process which is carried out by the thermal toner image fixing device shown in FIG. 3.

FIG. 5 shows a flowchart of the fuzzy reasoning process.

In a step S1, measured numerical values XO, YO, ZO representative of the surface reflectance, the resistance, and the ambient temperature, respectively, are calculated by the calculating unit 12 based on the output signals from the sheet reflectance sensor 21, the sheet resistance sensor 22, and the ambient temperature sensor 23.

In a step S2, the fuzzy reasoning processor 15 calculates the grades of membership of the values XO, YO, ZO using the membership functions of the fuzzy variables with respect to the surface reflectance, the sheet resistance, and the ambient temperature.

In a step S3, the proportions at which the grades of membership satisfy the conditional statements of the ten control rules R1 through R10 are calculated according to the following fuzzy logic operations:

$$R1: W1 = \mu L(XO) \; \mu L(YO) \; \mu L(ZO) \quad (1)$$
$$= \min.(\mu L(XO), \mu L(YO), \mu L(ZO))$$

$$R2: W2 = \mu L(XO) \; \mu H(YO) \; \mu L(ZO) \quad (2)$$
$$= \min.(\mu L(XO), \mu H(YO), \mu L(ZO))$$

$$R3: W3 = \mu M(XO) \; \mu M(YO) \; \mu L(ZO) \quad (3)$$
$$= \min.(\mu M(XO), \mu M(YO), \mu L(ZO))$$

$$R4: W4 = \mu H(XO) \; \mu L(YO) \; \mu L(ZO) \quad (4)$$
$$= \min.(\mu H(XO), \mu L(YO), \mu L(ZO))$$

$$R5: W5 = \mu H(XO) \; \mu H(YO) \; \mu L(ZO) \quad (5)$$
$$= \min.(\mu H(XO), \mu H(YO), \mu L(ZO))$$

$$R6: W6 = \mu L(XO) \; \mu L(YO) \; \mu H(ZO) \quad (6)$$
$$= \min.(\mu L(XO), \mu L(YO), \mu H(ZO))$$

$$R7: W7 = \mu L(XO) \; \mu H(YO) \; \mu H(ZO) \quad (7)$$
$$= \min.(\mu L(XO), \mu H(YO), \mu H(ZO))$$

$$R8: W8 = \mu M(XO) \; \mu M(YO) \; \mu H(ZO) \quad (8)$$
$$= \min.(\mu M(XO), \mu M(YO), \mu H(ZO))$$

$$R9: W9 = \mu H(XO) \; \mu L(YO) \; \mu H(ZO) \quad (9)$$
$$= \min.(\mu H(XO), \mu L(YO), \mu H(ZO))$$

$$R10: W10 = \mu H(XO) \; \mu H(YO) \; \mu H(ZO) \quad (10)$$
$$= \min.(\mu H(XO), \mu H(YO), \mu H(ZO))$$

The formula (1) indicates that the proposition that the measured surface reflectance XO is at the low level, the measured resistance YO is at the low level, and the measured ambient temperature ZO is at the low level is satisfied at the smallest one of the proportions at which the surface reflectance XO is at the low level, the resistance YO is at the medium level, and the ambient temperature ZO is at the low level. Stated otherwise, the conditional statements of the control rule R1 for the surface reflectance XO, the resistance YO, and the ambient temperature ZO are satisfied at the proportion W1.

The formula (2) indicates that the conditional statements of the control rule R2 for the surface reflectance XO, the resistance YO, and the ambient temperature ZO are satisfied at the proportion W2. The formula (3) indicates that the conditional statements of the control rule R3 for the surface reflectance XO, the resistance YO, and the ambient temperature ZO are satisfied at the proportion W3. Similarly, the formulas (4) through (10) indicate that the conditional statements of the control rules R4 through R10 for the surface reflectance XO, the resistance YO, and the ambient temperature ZO are satisfied at the proportions W4 through W10, respectively.

If the conditional statements of a control rule Rn are satisfied at a proportion Wn, then the execute statement (i.e., THEN statement) of the control rule Rn is also satisfied at the proportion Wn. Therefore, in a step S4, the membership functions of the fuzzy variables H, SH, M, SL, L in the execute statements in the respective control rules are multiplied by the proportion Wn at which the conditional statements of the control rules are satisfied, so that the membership functions in the execute statements in the control rules are corrected, as follows:

R1: $\mu H^*(t) = W1 \times \mu H(t)$;
R2: $\mu SH^*(t) = W2 \times \mu SH(t)$;
R3: $\mu SH^*(t) = W3 \times \mu SH(t)$;
R4: $\mu SH^*(t) = W4 \times \mu SH(t)$;
R5: $\mu M^*(t) = W5 \times \mu M(t)$;
R6: $\mu M^*(t) = W6 \times \mu M(t)$;
R7 $\mu SL^*(t) = W7 \times \mu SL(t)$;
R8: $\mu SL^*(t) = W8 \times \mu SL(t)$;
R9: $\mu SL^*(t) = W9 \times \mu SL(t)$; and
R10: $\mu L^*(t) = W10 \times \mu L(t)$ In a step S5, an optimum temperature threshold level TS for the thermal fixing roller 8 with respect to the measured surface reflectance XO, the measured resistance YO, and the measured ambient temperature ZO is determined according to the corrected membership functions in the execute statements in the control rules, as follows:

To determine the optimum temperature threshold level TS, a general membership function $\mu^*(t)$ of the control rules is first determined by effecting the following logic operation on the corrected membership functions:

$$\mu^*(t) = \mu H^*(t) \; \mu SH^*(t) \; \mu SH^*(t) \; \mu SH^*(t) \; \mu M^*(t) \quad (10)$$
$$\mu M^*(t) \; \mu SL^*(t) \; \mu SL^*(t) \; \mu SL^*(t)$$
$$\mu L^*(t)$$

In the formula (10), the proportion of the temperature threshold level TS for the thermal fixing roller 8 for optimum toner fixation is expressed as a function of the temperature at the measured surface reflectance XO, the measured resistance YO, and the measured ambient temperature ZO.

Then, the optimum temperature threshold level TS is determined by determining the weighted mean of the preset temperature of the fuzzy variables of the general membership function with the proportion belonging to the general membership function, as follows:

$$TS = \int t \cdot \mu^*(t) dt / \int \|{}^*(t) dt$$

In step S6, the surface temperature TR of the thermal fixing roller 8 as detected by the surface temperature sensor 1 is compared with the optimum temperature threshold level $TS_0$.

If $TS_0 > TR$, then the CPU 13 applies a control signal to the heater control circuit 25 to energize the heater 9 in a step S7. In response to the control signal from the CPU 13, the triac 28 in the heater control circuit 25 turns on the alternating current flowing through the heater 9, thus increasing the temperature of the heater 9 until TS=TR.

Conversely, if $TS_0 \leq TR$, then the CPU 13 does not apply a control signal to the heater control circuit 25, thereby de-energizing the heater 9 in a step S8. In the absence of any control signal from the CPU 13, the triac 28 in the heater control circuit 25 turns off the alternating current flowing through the heater 9. The heater 9 is de-energized and the thermal fixing roller 8 is cooled of its own accord until TS=TR.

As can be appreciated from FIG. 4(d), different membership functions in the execute statements are not applied to the respective control rules R1 through R10 but there exist only five membership functions in the execute statements with respect to ten control rules. For example, the membership function $\mu SH(t)$ is assigned commonly to each of the control rules R2, R3, and R4. Such a reduction in number of the membership functions in the execute statements is advantageous in shortening a calculation time in the steps S3 through S5.

Next, specific examples will be described with reference to FIGS. 8 and 9.

Figure 8:
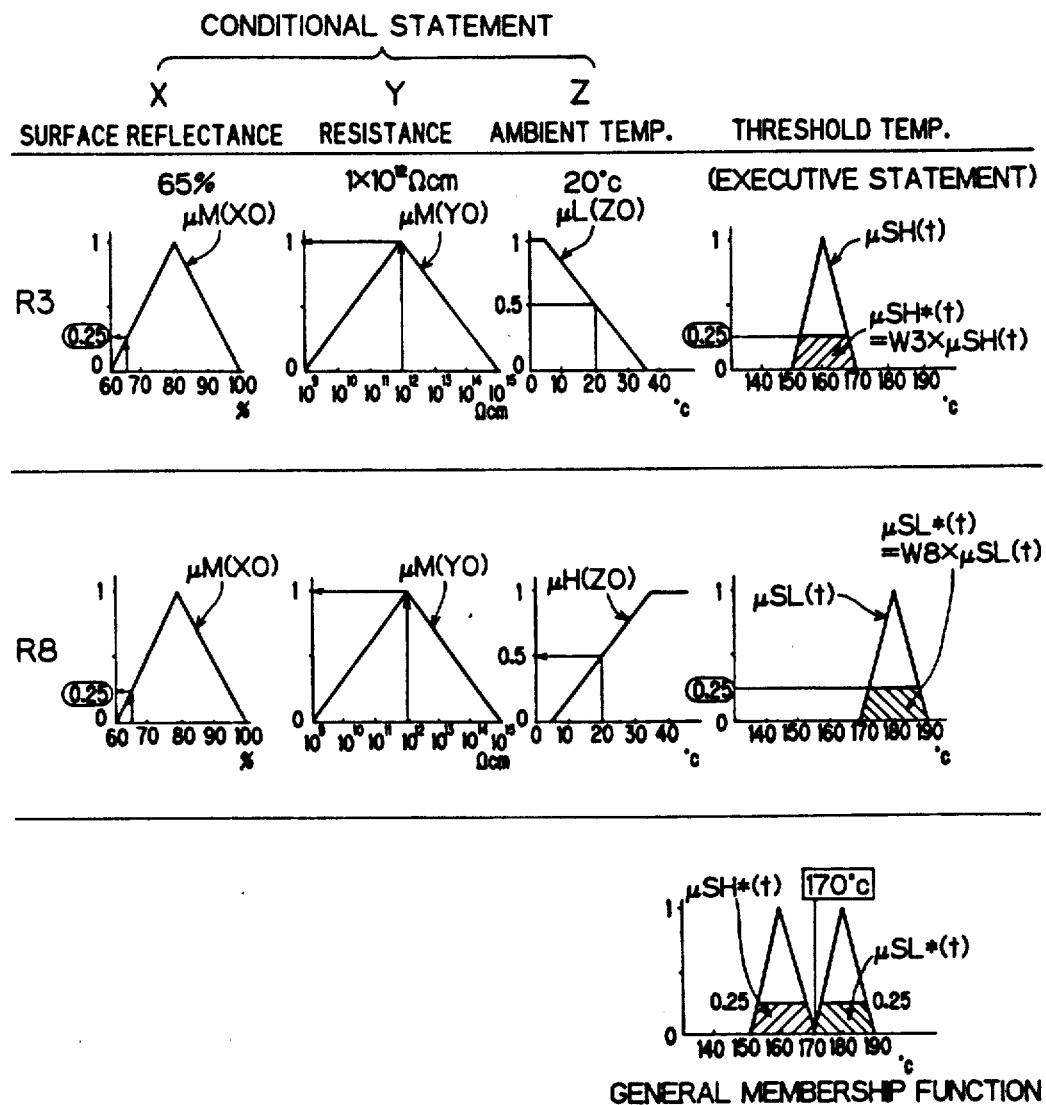
FIG. 8 shows various diagrams for illustrating a first example of the present invention.

The first example is shown in FIG. 8 where it is assumed that the surface reflectance of the sheet is 65%, the resistance is $1 \times 10^{12}$ Ωcm, and the ambient temperature is 20° C. With respect to the measured values given above, the values given by the membership functions L, M, and H or L and H of the surface reflectance, the resistance, and the ambient temperature are calculated. Since the value of the sheet resistance (the conditional statement YO) is $1 \times 10^{12}$ Ωcm, the values of both L(YO) and H(YO) are zero. The value of the membership function with respect to M(YO) is 1.0 as can be appreciated from FIG. 4(a). The sheet resistance (YO) is dependent only on M(YO), the applicable control rules under this condition are only R3 and R8 as can be appreciated from FIG. 3. Accordingly, the respective membership values of the sheet reflectance (X), the sheet resistance (Y) and the ambient temperature (Z) are obtained with respect only to the control rules R3 and R8.

With respect to the control rule R3, $\mu M(XO)=0.25$, $\mu M(YO)=1.0$, and $\mu L(ZO)=0.5$. Of these, the minimum value 0.25 is adopted as representative of the result of the logic product, i.e., W3=0.25. With respect to the control rule R8, $\mu M(XO)=0.25$, $\mu M(YO)=1.0$, and $\mu H(ZO)=0.5$. Of these, the minimum value 0.25 is adopted as representative of the result of the logic product, i.e., W8=0.25.

To obtain an optimum temperature threshold value, a logic sum of $\mu SH(t)$ and $\mu SL(t)$ is obtained as representaive of the general membership function, where $\mu SH(t)$ and $\mu SL(t)$ correspond respectively to the control rules R3 and R8. To this end, a weighted mean value of the areas indicated by oblique lines in FIG. 8 for $\mu SH(t)$ and $\mu SL(t)$ is obtained, which weighted mean value is 170° C. in this instance.

The second example is shown in FIG. 9 where it is assumed that the surface reflectance of the sheet is 75%, the resistance is $7 \times 10^{11}$ Ωcm, and the ambient temperature is 10° C. Similar to the first example, with respect to the measured values given above, the values given by the membership functions are calculated. From FIG. 4(a), the membership functions for the surface reflectance are $\mu L(XO)$ and $\mu M(XO)$. The membership functions for the sheet resistance are $\mu L(YO)$ and $\mu M(YO)$, and those for the ambient temperature are $\mu L(ZO)$ and $\mu M(ZO)$. There exist eight membership functions in total. However, from the table of FIG. 3, applicable the control rules are only R1, R3, R6 and R8.

With respect to each of the control rules, the values of the membership functions are obtained, and then the proportion which is the minimum value of the membership functions is multiplied to each of the membership functions in the execute statement to obtain the values in $\mu H(t)$, $\mu SH(t)$, $\mu M(t)$ and $\mu SL(t)$. Next, the logic sum of these membership functions in the executive statement are obtained to thus provide a general membership function. As shown in FIG. 9, through the calculation of the weighted mean value, the optimum temperature threshold is approximately equal to 161.5° C.

In this embodiment described above, the surface roughness of the sheet is detected as the surface reflectance thereof, the water content of the sheet as the electric resistance thereof, and the ambient temperature around the sheet or the thermal toner image fixing device is detected. The optimum temperature threshold level for the thermal fixing roller is determined using the detected values according to the fuzzy logic operations. Accordingly, even if the user uses different sheets of paper with different surface roughnesses and water contents at different ambient temperatures, the temperature threshold level for the thermal fixing roller can be optimized to achieve stable toner fixation at all times.

Since the above control sequence is carried out according to the fuzzy logic operations based on the detected values with a relatively small number of control rules, the time required to determine the optimum temperature threshold level is relatively short, and the control signal applied to the heater control circuit is subject to a relatively small amount of overshoot. As a consequence, any optimum temperature condition for toner image fixation can be met quickly.

Instead of calculating membership functions based on the values detected by the sensors in each cycle, they may be stored as a table of discrete values in the ROM, and read according to the control rules. Such an alternative is effective to reduce the processing time of the CPU.

The sensors in the thermal toner image fixing device may be of other types than illustrated. For example, the two electrically conductive rollers 33 may be replaced with a pair of registration rollers for aligning a sheet of paper fed out from a sheet cassette with a toner image to be transferred from a photosensitive drum. Such registration rollers are disposed between the sheet cassette and the photosensitive drum. The water content of the sheet of paper may be detected by detecting an attenuated level of microwave applied to the sheet of paper. The surface roughness of the sheet of paper may be detected by a sensor such as of Cds which detects visible light emitted from a light source such as a tungsten lamp and reflected by the sheet of paper.

The ambient environment in the conditional statements of each control rule is not limited to the ambient temperature. In addition to the ambient temperature, the temperature of the surface of the pressure roller for pressing the sheet of paper, which temperature affects the temperature at the boundary between the sheet and the toner, may be added to the conditional statements of each control rule.

Although a certain preferred embodiment of the present invention has been shown and described in detail, it should be understood that various changes and modifications may be made therein without departing from the scope of the appended claims.

What is claimed is:

1. A device for thermally fusing and fixing a toner image on a sheet, comprising:
   an energy source for supplying an energy;
   heating means connected to said energy source for generating heat to be applied to an image-formed sheet;

detecting means for detecting a quality of the sheet, a electric resistance of the sheet, and an ambient temperature of the sheet;

storage means for storing control rules used for determining a fixing parameter corresponding to the quality of the sheet, the electric resistance of the sheet, and the ambient temperature of the sheet; and processing means for determining the fixing parameter according to fuzzy logic operations based on the quality of the sheet, the electric resistance of the sheet, and the ambient temperature of the sheet as detected by said detecting means and the control rules read from said storage means, heat generated from said heating means being controlled in response to the fixing parameter determined by said processing means.

2. The device according to claim 1, further comprising temperature sensing means for sensing a temperature of said heating means, and wherein the temperature of said heating means is controlled in response to the fixing parameter determined by said processing means.

3. The device according to claim 2, wherein said detecting means comprises sheet quality detecting means for detecting the quality of the sheet, water content detecting means for detecting a water content of the sheet, and ambient temperature detecting means for detecting an ambient temperature around the sheet, wherein said storage means comprises means for storing the control rules used for determining an optimum temperature of said heating means, and wherein said processing means comprises means for determining the optimum temperature of said heating means according to fuzzy logic operations based on the quality of the sheet, the water content, and the ambient temperature detected by said sheet quality detecting means, said water content detecting means, and said ambient temperature detecting means, respectively, and the control rules read from said storage means.

4. The device according to claim 3, wherein said sheet quality detecting means detects a surface roughness of the sheet.

5. The device according to claim 4, wherein said sheet quality detecting means comprises light emitting means for emitting light toward a surface of the sheet and light receiving means disposed to receive light reflected from the surface of the sheet, said light receiving means outputting a signal representative of the quality of the sheet.

6. The device according to claim 3, wherein said water content detecting means detects an electric resistance of the sheet.

7. The device according to claim 6, wherein said water content detecting means comprises voltage applying means for applying a voltage across the sheet and current detecting means for detecting a current flowing in the sheet, the current detected by said current detecting means being representative of the water content of the sheet.

8. The device according to claim 1, further comprising switching means disposed between said energy source and said heating means, said switching means performing on and off actions in response to the fixing parameter determined by said processing means.

* * * * *